United States Patent
Da Fonseca et al.

(10) Patent No.: US 11,470,407 B2
(45) Date of Patent: Oct. 11, 2022

(54) ACQUISITION OF EXTRACTS OF A MULTIMEDIA STREAM ON A TERMINAL

(71) Applicant: ORANGE, Paris (FR)

(72) Inventors: Caroline Da Fonseca, Noiseau (FR); Yann Ruello, Antony (FR); Christophe Rufin, Boulogne Billancourt (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/084,754

(22) PCT Filed: Mar. 14, 2017

(86) PCT No.: PCT/FR2017/050568
§ 371 (c)(1),
(2) Date: Sep. 13, 2018

(87) PCT Pub. No.: WO2017/158274
PCT Pub. Date: Sep. 21, 2017

(65) Prior Publication Data
US 2019/0075373 A1 Mar. 7, 2019

(30) Foreign Application Priority Data

Mar. 16, 2016 (FR) ..................................... 16 52229

(51) Int. Cl.
*H04N 9/80* (2006.01)
*H04N 21/8547* (2011.01)
(Continued)

(52) U.S. Cl.
CPC ... *H04N 21/8547* (2013.01); *H04N 21/41265* (2020.08); *H04N 21/4334* (2013.01);
(Continued)

(58) Field of Classification Search
USPC .................................................. 386/248, 291
See application file for complete search history.

(56) References Cited

U.S. PATENT DOCUMENTS

| | | | | |
|---|---|---|---|---|
| 5,801,753 A | * | 9/1998 | Eyer | ................ H04N 21/26283 725/50 |
| 6,384,870 B1 | * | 5/2002 | Kempisty | ............ H04N 21/485 348/E5.111 |

(Continued)

FOREIGN PATENT DOCUMENTS

| | | |
|---|---|---|
| EP | 1 788 806 A1 | 5/2007 |
| WO | 2006/012378 A1 | 2/2006 |
| WO | 2015/188629 A1 | 12/2015 |

*Primary Examiner* — Nigar Chowdhury
(74) *Attorney, Agent, or Firm* — Faegre Drinker Biddle & Reath LLP

(57) ABSTRACT

A method for acquiring an extract of a multimedia stream being broadcast on a user's display device, the method being implemented in an user terminal separate from the display device and comprising the following steps: upon reception of a user input for receiving an extract of the multimedia stream being broadcast on the display device, sending to the display device a first request for an identifier of the multimedia stream being broadcast; upon reception of the identifier of the multimedia stream being broadcast, sending to the content server a second request for receiving the multimedia stream extract, said second request including a timestamp of the user input, the identifier of the multimedia stream being broadcast and a duration of the multimedia stream extract; and receiving from the content server the multimedia stream extract or a link to obtain the latter.

12 Claims, 3 Drawing Sheets

(51) Int. Cl.
  *H04N 21/41* (2011.01)
  *H04N 21/433* (2011.01)
  *H04N 21/44* (2011.01)
  *H04N 21/658* (2011.01)
  *H04N 5/76* (2006.01)
  *H04L 67/125* (2022.01)
  *H04L 65/1083* (2022.01)
  *H04L 65/612* (2022.01)

(52) U.S. Cl.
  CPC ......... *H04N 21/44* (2013.01); *H04N 21/6581* (2013.01); *H04L 65/1083* (2013.01); *H04L 65/612* (2022.05); *H04L 67/125* (2013.01)

(56) References Cited

U.S. PATENT DOCUMENTS

| | | | |
|---|---|---|---|
| 6,675,385 B1* | 1/2004 | Wang | H04N 21/84 725/50 |
| 7,127,735 B1* | 10/2006 | Lee | H04N 21/6547 725/87 |
| 9,565,476 B2* | 2/2017 | Bakke | H04N 21/84 |
| 10,015,467 B2* | 7/2018 | Suh | H04N 13/194 |
| 10,136,152 B2* | 11/2018 | Hendry | H04N 19/132 |
| 2002/0013789 A1* | 1/2002 | Okuno | H04H 20/28 715/202 |
| 2002/0174430 A1* | 11/2002 | Ellis | G11B 27/005 725/46 |
| 2003/0007780 A1* | 1/2003 | Senoh | G11B 27/329 386/E5.052 |
| 2003/0059047 A1* | 3/2003 | Iwamura | H04N 21/440281 348/E7.056 |
| 2004/0107449 A1* | 6/2004 | Fukuda | H04N 21/47 348/E7.054 |
| 2004/0113929 A1* | 6/2004 | Matsuzaki | H04N 21/443 348/E5.006 |
| 2004/0131328 A1* | 7/2004 | Pan | H04N 21/482 386/234 |
| 2004/0158854 A1* | 8/2004 | Nagasawa | H04N 21/4223 348/E5.103 |
| 2006/0143656 A1* | 6/2006 | Sakamoto | H04N 21/42221 725/39 |
| 2007/0021211 A1* | 1/2007 | Walter | A63F 13/12 463/40 |
| 2008/0022318 A1* | 1/2008 | Yoshino | H04N 21/8146 725/68 |
| 2008/0059645 A1* | 3/2008 | Gregotski | H04L 29/12509 709/231 |
| 2008/0181498 A1* | 7/2008 | Swenson | H04N 19/59 382/173 |
| 2008/0278634 A1* | 11/2008 | Huang | H04N 21/4345 348/E5.096 |
| 2010/0146546 A1* | 6/2010 | Nishimura | H04N 21/41422 725/39 |
| 2011/0231569 A1* | 9/2011 | Luby | H04N 21/23406 709/234 |
| 2012/0303834 A1* | 11/2012 | Adam | H04L 65/4084 709/231 |
| 2012/0311100 A1* | 12/2012 | Kim | H04N 21/44204 709/219 |
| 2014/0282715 A1* | 9/2014 | Yang | H04N 21/8586 725/34 |
| 2014/0375894 A1* | 12/2014 | Kellerman | H04N 21/4398 348/731 |
| 2015/0120839 A1* | 4/2015 | Kannan | H04L 51/046 709/206 |
| 2015/0237396 A1* | 8/2015 | Marquant | H04N 21/6125 725/28 |
| 2015/0326900 A1* | 11/2015 | Yoshizawa | H04N 21/6543 725/9 |
| 2016/0034119 A1* | 2/2016 | Quail | H04L 65/60 715/719 |
| 2016/0063949 A1* | 3/2016 | Tsuchida | H04N 21/482 345/590 |
| 2016/0073155 A1* | 3/2016 | Subramaniam | H04N 21/85406 725/32 |
| 2016/0266861 A1* | 9/2016 | Kim | H04N 9/3147 |
| 2016/0300068 A1* | 10/2016 | Gillespie | G06F 21/602 |
| 2017/0169039 A1* | 6/2017 | Brown | H04N 21/475 |
| 2019/0007749 A1* | 1/2019 | Zeidman | G06Q 30/0207 |

\* cited by examiner

ACQUISITION OF EXTRACTS OF A MULTIMEDIA STREAM ON A TERMINAL

CROSS-REFERENCE TO RELATED APPLICATIONS

This application is the U.S. national phase of the International Patent Application No. PCT/FR2017/050568 filed Mar. 14, 2017, which claims the benefit of French Application No. 16 52229 filed Mar. 16, 2016, the entire content of which is incorporated herein by reference.

FIELD

The present invention relates to the field of accessing multimedia content from a user terminal, in particular to accessing clips of a broadcast multimedia stream.

BACKGROUND

The invention advantageously applies to a handheld type of user terminal (smart phone, touchpad, Personal Digital Assistant (PDA), etc.).

TV decoders, such as a set-top box for example, now fulfill many functions: in addition to receiving multimedia content from one or more television channels, they can provide access to an IP network in order to retrieve content from a dedicated server for example, or to receive contextual data or metadata associated with multimedia content being broadcast.

In addition, the set-top box can be a wireless access point, Wi-Fi for example, enabling user terminals other than the television to access the IP network.

The set-top box also offers recording capabilities, allowing the user to use a remote control to begin recording multimedia content currently being broadcast or to schedule the recording of multimedia content being broadcast at a later time.

However, not only is it complex and error-prone to schedule such recording (it requires defining the start of the recording and the end of the recording, and requires verifying that there is sufficient memory available in the set-top box), but in addition it does not facilitate sharing the recorded content.

For example, if a user wants to retrieve content on a user terminal by accessing the set-top box, the user must search all the content stored on the set-top box to find the desired content, and then export it to the user terminal so it can then be shared (on a social network, for example).

In addition, these solutions are not suitable for capturing short clips (a few minutes) of a broadcast multimedia stream.

The present invention improves the situation.

SUMMARY

For this purpose, a first aspect of the invention relates to a method for acquiring a clip of a multimedia stream being broadcast on a display device of a user, the method being implemented in a user terminal which is distinct from the display device and comprising the steps of:
upon receiving user input asking to receive a clip of the multimedia stream being broadcast on the display device, sending a first request to the display device to request an identifier of the multimedia stream being broadcast;
upon receiving the identifier of the multimedia stream being broadcast, sending a second request to the content server asking to receive the multimedia stream clip, the second request comprising a timestamp for the user input, the identifier of the multimedia stream being broadcast, and a duration of the multimedia stream clip;
receiving, from the content server, the multimedia stream clip or a link for obtaining the multimedia stream clip.

The term "user terminal" is understood to mean any device, preferably handheld, having an integrated user interface, such as a smart phone, a touch pad, a PDA, or a handheld computer.

The term "display device" is understood to mean any device whose primary function is to display multimedia content. For example, it can be a television, a desktop computer, a video projector, etc.

"User input" is understood to mean any predefined interaction between the user and the user interface of the user terminal. For example, it can be a click, a gesture (tap, tap-slide, etc.), the mechanical action of a button, or even a voice command.

The present invention thus enables the acquisition of multimedia stream clips which is easy and rapid for the user, reducing the interactions required to obtain the clips. In addition, the acquisition of the stream identifier is automated between the user terminal and the display device (or a decoder of the display device), thereby improving the responsiveness associated with the sending of the second request. In addition, the acquisition of the clip may be achieved via a user terminal having a more ergonomic user interface than that of the display device (which is typically a remote control).

According to one embodiment, the duration of the multimedia stream clip is predefined.

The user therefore does not need to define the duration of the desired clip, improving the responsiveness of the method. Such a method is particularly advantageous in a context of acquiring short clips.

According to one embodiment, the method may comprise a preliminary step of launching, on the user terminal, an application dedicated to the content server, and the user input may be received from a graphical user interface of the launched application.

The use of a dedicated application facilitates clip acquisition and improves the responsiveness of the method.

According to one embodiment, the identifier of the multimedia stream being broadcast may be received from a decoder connected to the display device, the decoder being able to process a received multimedia stream for display on the display device.

Decoder is understood to mean any device capable of processing a multimedia stream such as a video stream for example, for transmission to the display device. The decoder can therefore be a set-top box for example.

In addition, the decoder may further comprise a wireless access point to an IP network, and the user terminal may access the content server via the decoder and via the IP network.

Thus, the first request and the second request may pass through the decoder, for which the access point may be a preferred network of the user of the user terminal, which facilitates sending requests.

Alternatively, the user terminal may access the content server via a connection to a mobile network.

The second request can thus be sent even when the user terminal does not have access to a local area network connected to a decoder of the display device.

According to one embodiment, the method may further comprise, upon receiving the multimedia stream clip or the link for obtaining the multimedia stream clip, a step of publishing the multimedia stream clip or said link on a newsfeed of the user.

The acquisition of a clip on a user terminal makes it easier to share this clip, which is not possible when the clip is recorded on the decoder, as described in the introductory part.

A second aspect of the invention concerns a computer program comprising instructions for implementing the method according to the first aspect of the invention, when these instructions are executed by a processor.

A third aspect of the invention relates to a user terminal for the acquisition of a clip of a multimedia stream being broadcast on a display device of a user, the display device being distinct from the user terminal, the user terminal comprising:

a receiving interface for receiving user input asking to receive a clip of the multimedia stream being broadcast on the display device;

a processor configured to send, via a transmission interface, a first request to the display device to request an identifier of the multimedia stream being broadcast, and, when the receiving interface receives the identifier of the multimedia stream being broadcast, to send a second request to the content server asking to receive the multimedia stream clip, said second request comprising a timestamp for the user input, the identifier of the multimedia stream being broadcast, and a duration of the multimedia stream clip.

The receiving interface is further adapted for receiving, from the content server, said multimedia stream clip or a link for obtaining said multimedia stream clip.

BRIEF DESCRIPTION OF THE DRAWINGS

Other features and advantages of the invention will be apparent from examining the following detailed description and the accompanying drawings in which.

DETAILED DESCRIPTION

Figure 1:
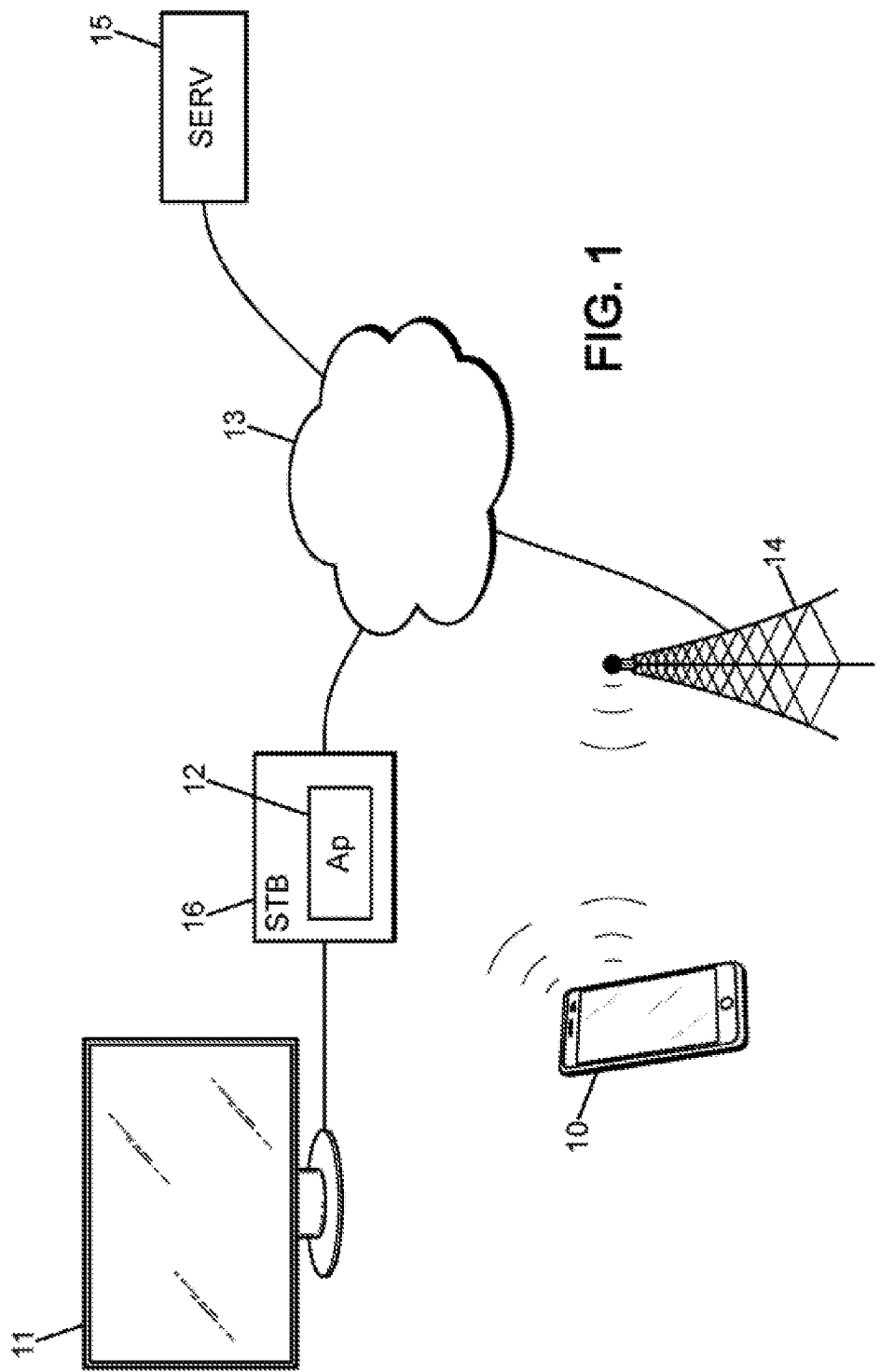
FIG. 1 illustrates a system according to one embodiment of the invention.

FIG. 1 illustrates a system according to one embodiment of the invention.

The system comprises a user terminal 10, such as a smart phone, a touchpad, a desktop or laptop computer, or any other terminal having a user interface such as a keyboard, a touch screen, a mouse, etc. The user terminal 10 is further adapted for accessing a network 13, such as an IP network, via a wired or wireless access point 12. In FIG. 1, a wireless access point 12, Wi-Fi for example, is represented.

Alternatively, the user terminal 10 may access the IP network 13 via a base station 14 of a mobile network (3G, 4G or any other generation).

The access point 12 may be integrated into a decoder 16 such as a set-top box STB for example, the decoder 16 being connected to a display device 11 such as a television, a computer screen, or a video projector. Alternatively, the access point 12 is distinct from the decoder 16, which can access the access point via a wired connection for example.

The decoder 16 is adapted to receive a broadcast multimedia stream, such as a multiplexed video stream, and is adapted to transmit the multimedia stream of a channel to the display device 11 in order to display the multimedia stream of the channel being broadcast.

The user can interact with the television set via the decoder 16 and a remote controller not represented in FIG. 1, or via a user interface of the decoder (buttons or a touch screen for example).

A content server 15 is accessed via the IP network 13. According to the invention, the content server 15 may be a server of the provider who is broadcasting multimedia streams of television channels to the decoders 16 of users. To this end, the multimedia streams may be streamed from the server 15 or from another server of the provider. Alternatively, the multimedia stream may be broadcast over the air via dedicated antennas.

The server 15 stores multimedia streams, for example divided into programs, television programs for example, in an internal memory. The stored programs are associated with a multimedia stream identifier (an identifier of a television channel for example) and a broadcast time slot.

The server 15 may also store metadata or contextual content related to certain programs or certain multimedia streams (certain channels). When viewing a multimedia stream, a user may thus use the remote control to request contextual content (subtitle, commercial content) related to the stream being broadcast. The decoder 15 may send a request to the server 15 requesting such contextual context, the request possibly containing an identifier of the stream being broadcast.

Figure 2:
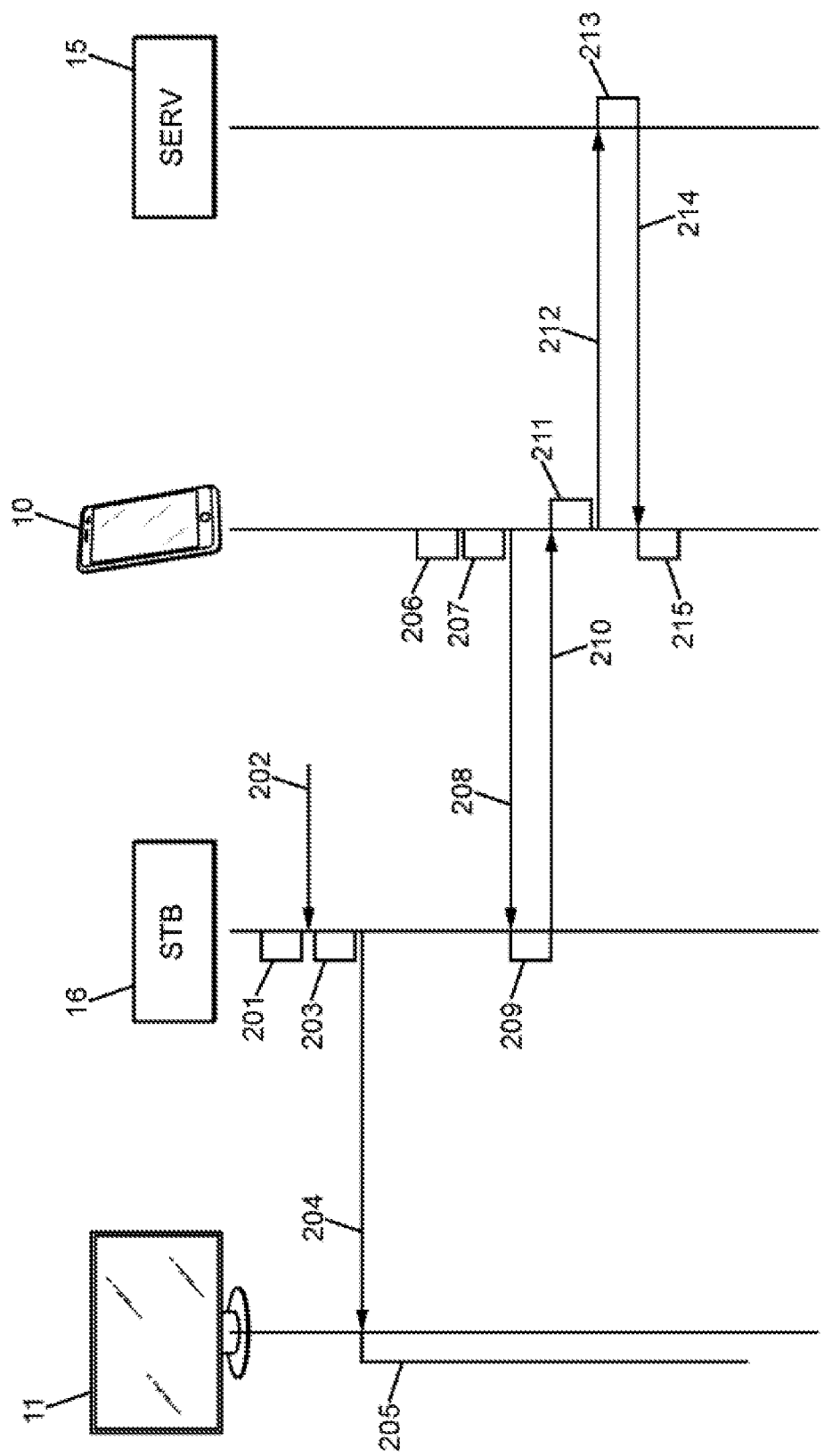
FIG. 2 is a diagram illustrating the steps of a method according to one embodiment of the invention.

FIG. 2 is a diagram of the exchanges which occur, illustrating the steps of a method according to one embodiment of the invention.

In step 201, the user turns on the decoder 201 which then begins to receive multimedia streams in step 202. The multimedia streams are processed in step 203 by the decoder 16, for example by demultiplexing them in order to transmit the multimedia stream corresponding to a channel selected by the user, to the display device 11, in a step 204.

The display device 11 displays the multimedia stream being broadcast and received from the decoder 16, in step 205.

In step 206, the user can launch an application dedicated to the provider in charge of the distribution of content, for example an application dedicated to the server 15, thereby allowing the user terminal 10 to communicate with the remote server 15.

In step 207, the user requests the recording of a clip of the multimedia stream being broadcast and displayed on the display device 11, via user input on the user terminal 10. No restrictions are placed on the user input, which is dependent in particular on the user interface of the user terminal 10 and on the graphical user interface of the application dedicated to the content server 15. For example, the user input may be the selection (click or tap) of a "Share the current stream" button displayed in the graphical user interface of the application.

Upon receiving the user input, the user terminal 10 sends a first request to the display device 11, in step 208, requesting an identifier of the multimedia stream being broadcast. The first request is thus sent to the decoder 16 via a wired or wireless route (for example when the user terminal 10 accesses a WiFi local area network of the decoder 16).

In step 209, the decoder processes the first request and retrieves an identifier of the stream being broadcast and displayed on the display device 11 (for example an identifier of the television channel) and generates a response message including the identifier of the stream being broadcast.

The response message is returned to the user terminal 10 in step 210.

In step 211, upon receiving the response message comprising the identifier of the multimedia stream being broadcast, the user terminal 10 generates a second request in step 211 in order to receive the multimedia stream clip, the second request comprising a timestamp for the user input, the identifier of the multimedia stream being broadcast, and a duration of the multimedia stream clip.

The timestamp may be stored in the user terminal 10 upon receipt of the user input 207. No restriction is placed on the timestamp, which may be absolute (date, hour, minute, and second) or relative (moment in minutes and seconds within a given program broadcast on a channel) An internal clock of the user terminal 10 may be used for determining the timestamp.

The duration of the requested multimedia stream clip may for example be predetermined, accelerating the generation of the second request to the extent that a second user input for defining the required duration is not required. Alternatively, the user may enter a required duration for the clip, via a user interface of the user terminal 10.

In step 212, the user terminal 10 sends the second request to the content server 15, via the base station 14 or via the access point 12.

In step 213, the content server 15 accesses an internal memory in order to extract the identified multimedia stream. On the basis of the timestamp and duration indicated in the second request, the content server 15 generates a clip of the multimedia stream.

In step 214, the generated clip of the multimedia stream is sent by the content server 15 in step 10. Additionally or alternatively, a link (such as a URL for example) to the generated clip of the multimedia stream is sent to the user terminal 10. In this case, the content server 15 locally stores the clip of the multimedia stream. In addition, the second request may comprise a user identifier (for example an identifier with the provider, or a user id/password combination, an email address, etc.) and the clip of the multimedia stream may be stored in a memory area of the server 15 which is dedicated to the identified user. This memory area may be managed remotely via the user terminal 10, in order to delete clips, download them, or send them to the decoder 16 which is also identified on the server 15. The user identifier of the decoder and the user identifier of the user terminal 10 are preferably identical.

Upon receiving the clip of the multimedia stream or the link for obtaining the clip of the multimedia stream, the user terminal 10 may publish the multimedia stream clip or the link on a newsfeed of the user, in an optional step 215. For example, this publishing may involve uploading the multimedia clip to a remote server which manages the user's newsfeed (a social network server for example).

Optionally, step 215 may be implemented after there is user input to confirm publishing the link or the clip.

The present invention thus enables the acquisition of multimedia stream clips which is easy and rapid for the user, by reducing the interactions required to obtain the clip. In addition, the acquisition of the stream identifier is automated between the user terminal 10 and the decoder 16, thereby improving the responsiveness associated with the sending of the second request. In addition, the acquisition of the clip may be achieved via a user terminal 10 having a more ergonomic user interface than that of the decoder 16 (which is typically a remote control).

The acquisition of a clip on a user terminal 10 also makes it easier to share this clip, which is not the case when the clip is recorded on the decoder 16, as described in the introductory part.

Figure 3:
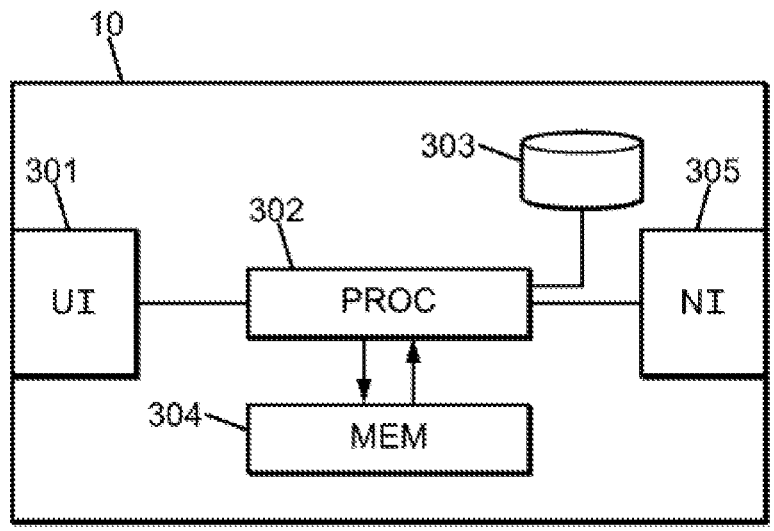
FIG. 3 illustrates a user terminal according to one embodiment of the invention.

FIG. 3 represents a user terminal 10 according to one embodiment of the invention.

The user terminal 10 comprises a random access memory 304 and a processor 302 for storing instructions to implement steps 206, 207, 211, and 215 described above. The user terminal 10 also comprises storage memory 303 for storing data to be retained during or after application of the method. In particular, the storage memory 303 may temporarily store the identifier of the multimedia stream, and may store the clip or the received link. The user terminal 10 further comprises a user interface 301 adapted for receiving user input. As explained above, no restrictions are placed on the user interface 301, which may be a touch screen, a keyboard, a mouse, etc. The user terminal 10 may further comprise a network interface 305 which may comprise a Wi-Fi interface and/or an interface to a mobile network.

Figure 4:
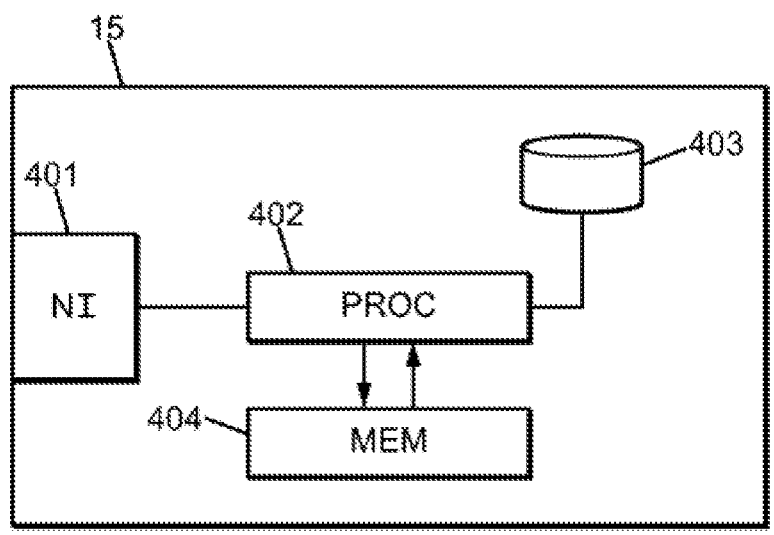
FIG. 4 illustrates a content server according to one embodiment of the invention.

FIG. 4 shows a content server 15 according to one embodiment of the invention.

The server 15 comprises a random access memory 404 and a processor 402 for storing instructions to implement step 213 of FIG. 2. The server 15 also comprises storage memory 403 for storing data to be retained during or after application of the method. In particular, the storage memory 403 may store multimedia streams in association with multimedia stream identifiers. For example, it may store the programs from a day of a television channel or of a plurality of television channels. It may also store metadata or contextual data respectively associated with multimedia streams or programs. The content server 15 further comprises a network interface 401 adapted for receiving the second requests in step 212 and for transmitting the multimedia stream clip or the link in step 214. The network interface 401 may also receive requests for metadata or contextual data, and in return may transmit metadata or contextual data. In addition, the network interface 401 may receive a program request (for example when the server 15 provides catch-up or on-demand video services) and may send back a program in return.

The processor 402 is able, upon receiving the timestamp and the identifier of the multimedia stream, to determine the start of a clip to be extracted from a multimedia stream. As indicated above, the timestamp may be absolute (a date) or relative (a moment in a program of a television channel) The processor 402 is then able to process the video in order to extract a clip starting at the defined beginning and of a duration corresponding to the duration indicated in the second request.

The present invention is not limited to the embodiments described above as examples; it extends to other variants.

In addition, the examples given concern three connected entities and a single access point. Such an architecture is provided for illustration only, and does not restrict the invention to these examples.

The invention claimed is:

1. A method for acquiring a clip of a multimedia stream being broadcast on a display device of a user, the method being implemented in a user terminal which is distinct from the display device and comprising:

upon receiving user input asking to receive, in the user terminal receiving the user input, and from the content server, a clip of the multimedia stream being broadcast on the display device, sending a first request to a decoder connected to the display device to request an identifier of the multimedia stream being broadcast;

receiving from said decoder, in response to the first request, a response message including the identifier of the multimedia stream being broadcast, the identifier being retrieved by the decoder, of the multimedia stream being displayed on the display device;

upon receiving said message including the identifier of the multimedia stream being broadcast, generating a second request asking to receive the multimedia stream clip from the content server, said second request comprising a timestamp for said user input asking to receive a clip of the multimedia stream being broadcast on the display device, the identifier of the multimedia stream being broadcast, and a duration of the multimedia stream clip;

sending said second request to the content server;

receiving, from the content server, said multimedia stream clip or a link for obtaining said multimedia stream clip, said multimedia stream clip being generated by the content server on the basis of said timestamp for the user input and said duration indicated in said request; and upon receiving the multimedia stream clip or the link for obtaining said multimedia stream clip, publishing said received multimedia stream clip or said received multimedia link on a newsfeed of the user.

2. The method according to claim 1, wherein the duration of the multimedia stream clip is predefined.

3. The method according to claim 1, comprising preliminarily:

launching, on the user terminal, an application dedicated to the content server, wherein the user input is received from a graphical user interface of the launched application.

4. The method according to claim 1, wherein the response message including the identifier of the multimedia stream being broadcast is received from a decoder connected to the display device, said decoder being able to process a received multimedia stream for display on the display device.

5. The method according to claim 4, wherein the decoder further comprises a wireless access point to an IP network, and wherein the user terminal accesses the content server via the decoder and via the IP network.

6. The method according to claim 1, wherein the user terminal accesses the content server via a connection to a mobile network.

7. A non-transitory computer storage medium, storing instructions of a computer program for implementing the method according to claim 1, when these instructions are executed by a processor.

8. The method according to claim 1, wherein the identifier is an identifier of the television channel broadcasting the multimedia stream.

9. The method according to claim 1, wherein the second request comprises a user identifier, the clip of the multimedia stream being stored in a memory area of the server with is dedicated to the user identifier.

10. The method according to claim 1, further comprising, upon receiving the multimedia stream clip or the link for obtaining said multimedia stream clip, uploading the multimedia stream clip to a remote server which manages a newsfeed of the user, said remote server publishing said multimedia stream clip or said link on the user's newsfeed.

11. The method according to claim 1, wherein the publishing of said received multimedia stream clip or said received link on a newsfeed of the user is implemented after a user confirmation.

12. A user terminal for the acquisition of a clip of a multimedia stream being broadcast on a display device of a user, said display device being distinct from the user terminal, said user terminal comprising:

a receiving interface for receiving user input asking to receive, in the user terminal receiving the user input, and from the content server, a clip of the multimedia stream being broadcast on the display device and for receiving from a decoder connected to the display device, a response message including an identifier of the multimedia stream being broadcast on the display device, the identifier being retrieved by the decoder, of the stream being displayed on the display device;

a processor configured to send, via a transmission interface, a first request to the decoder, the display device to request the identifier of the multimedia stream being broadcast, and, when the receiving interface receives the identifier of the multimedia stream being broadcast, to generate a second request asking to receive the multimedia stream clip from the content server, and to send the second request to the content server, said second request comprising a timestamp for said user input asking to receive a clip of the multimedia stream being broadcast on the display device, the identifier of the multimedia stream being broadcast, and a duration of the multimedia stream clip;

wherein the receiving interface is further adapted for receiving, from the content server, said multimedia stream clip or a link for obtaining said multimedia stream clip, said multimedia stream clip being generated by the content server on the basis of said timestamp for the user input and said duration indicated in said request; and wherein the processor is further configured to, upon receiving the multimedia stream clip or the link for obtaining said multimedia stream clip, publish said received multimedia stream clip or said received link on a newsfeed of the user.

* * * * *